(12) United States Patent
Mariano

(10) Patent No.: US 9,088,845 B2
(45) Date of Patent: Jul. 21, 2015

(54) MUSIC STAND MICROPHONE MOUNT

(71) Applicant: Kenneth Mariano, Naples, FL (US)

(72) Inventor: Kenneth Mariano, Naples, FL (US)

(*) Notice: Subject to any disclaimer, the term of this patent is extended or adjusted under 35 U.S.C. 154(b) by 0 days.

(21) Appl. No.: 14/189,731

(22) Filed: Feb. 25, 2014

(65) Prior Publication Data
US 2014/0239132 A1 Aug. 28, 2014

Related U.S. Application Data

(60) Provisional application No. 61/769,635, filed on Feb. 26, 2013.

(51) Int. Cl.
| | |
|---|---|
| *H04R 3/00* | (2006.01) |
| *H04R 1/08* | (2006.01) |
| *H02G 3/32* | (2006.01) |
| *B25B 5/16* | (2006.01) |
| *B25B 5/10* | (2006.01) |
| *H04R 1/02* | (2006.01) |

(52) U.S. Cl.
CPC ... *H04R 1/08* (2013.01); *B25B 5/10* (2013.01); *B25B 5/16* (2013.01); *H02G 3/32* (2013.01); *H04R 1/028* (2013.01); *H04R 3/002* (2013.01)

(58) Field of Classification Search
CPC ............ B25B 5/10; B25B 58/16; H04R 1/08; H04R 3/002; H02G 3/32
USPC ............ 248/441.1, 309.1, 313, 316.1, 230.6, 248/231.21, 231.71, 231.85, 229.1, 222.14; 84/280, 327, 329; 381/361, 363, 366
See application file for complete search history.

(56) References Cited

U.S. PATENT DOCUMENTS

| | | | | |
|---|---|---|---|---|
| 4,325,143 | A * | 4/1982 | Kerr | 455/90.3 |
| 4,569,498 | A * | 2/1986 | Ermanski | 248/441.1 |
| 5,488,890 | A * | 2/1996 | Biasini | 84/280 |
| 6,156,026 | A * | 12/2000 | Rondeau | 248/231.41 |
| 6,757,400 | B1 * | 6/2004 | Cheng | 381/361 |
| 6,842,528 | B2 * | 1/2005 | Kuerti et al. | 381/361 |
| 2003/0127572 | A1 * | 7/2003 | Meyer | 248/125.8 |
| 2003/0213882 | A1 * | 11/2003 | Chen | 248/316.1 |
| 2005/0262987 | A1 * | 12/2005 | Chen | 84/453 |
| 2005/0284995 | A1 * | 12/2005 | Hutter, III | 248/235 |
| 2007/0262219 | A1 * | 11/2007 | Hutter, III | 248/229.1 |

* cited by examiner

*Primary Examiner* — Tan Le

(57) ABSTRACT

A microphone mount for a music stand is provided. The microphone mount may include a clamping portion. The clamping portion may be used to releasably secure to a music stand shelf. A gooseneck may releasably connect with the microphone mount. The gooseneck may include a microphone clip which releasably secures a microphone. Therefore, a user may sing into a microphone and read music at the same time using the present invention.

5 Claims, 4 Drawing Sheets

MUSIC STAND MICROPHONE MOUNT

CROSS-REFERENCE TO RELATED APPLICATION

This application claims the benefit of priority of U.S. provisional application No. 61/769,635, filed Feb. 26, 2013, the contents of which are herein incorporated by reference.

BACKGROUND OF THE INVENTION

The present invention relates to a microphone mount and, more particularly, to a microphone mount attachable to a music stand.

Currently, for a musician to read from sheet music and sing from a microphone, a microphone stand and a music stand must be provided. The microphone and music stand are bulky and difficult to transport.

As can be seen, there is a need for a device that combines the microphone stand and music stand.

SUMMARY OF THE INVENTION

In one aspect of the present invention, a microphone mount comprises: a clamping portion formed to releasably secure to an object; and a gooseneck comprising a first end and a second end, wherein the first end is attached to the microphone mount and the second end comprises a microphone clip.

In another aspect of the present invention, a microphone mount comprises: a first angle clamp; a second angle clamp attached to the first angle clamp and forming a slot in between at least a portion of the first angel clamp and the second angle clamp; and a connector formed to releasably connect to at least one gooseneck.

These and other features, aspects and advantages of the present invention will become better understood with reference to the following drawings, description and claims.

DETAILED DESCRIPTION OF THE INVENTION

Figure 1:
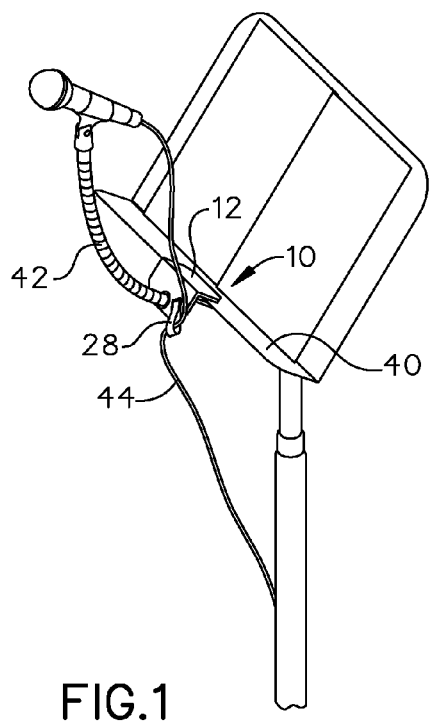
FIG. 1 is a perspective view of the present invention shown in use.
Figure 2:
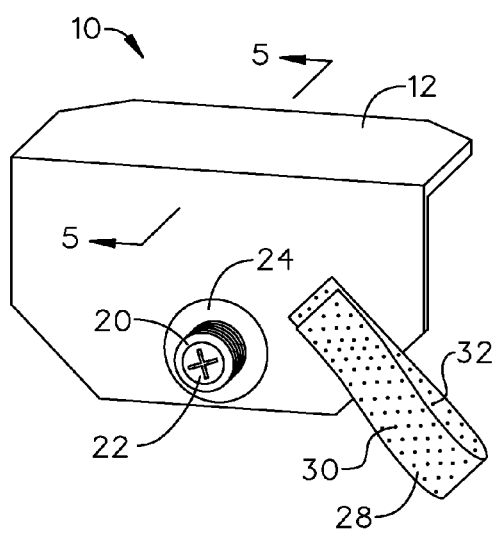
FIG. 2 is a perspective view of the present invention.
Figure 3:
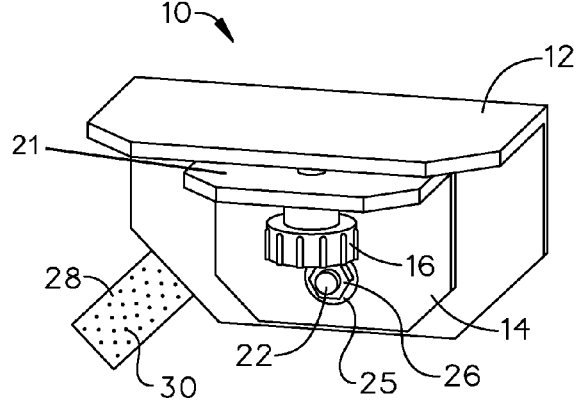
FIG. 3 is a rear perspective view of the present invention.
Figure 4:
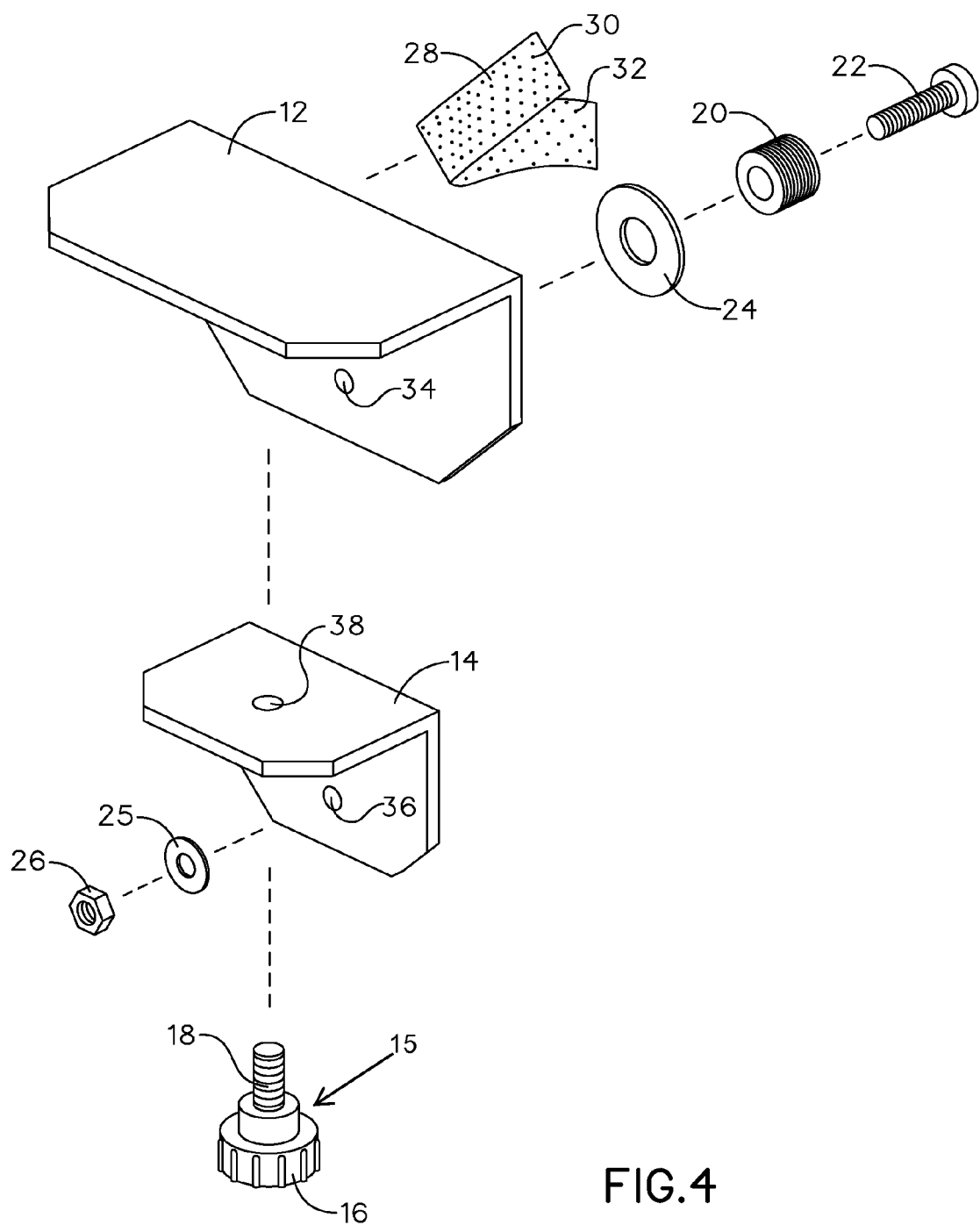
FIG. 4 is a rear exploded view of the present invention.
Figure 5:
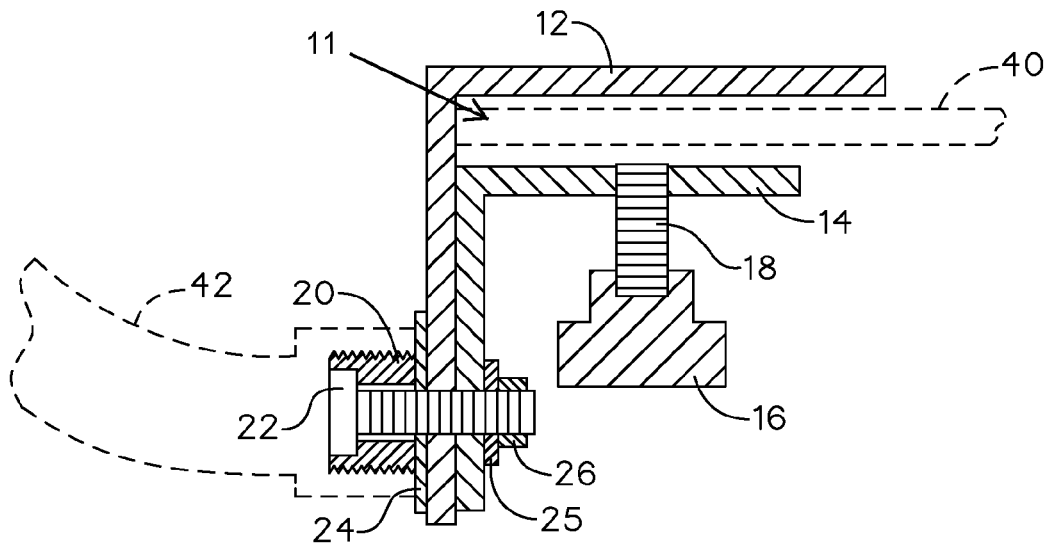
FIG. 5 is a section view of the present invention taken along line 5-5 in FIG. 2.
Figure 6:
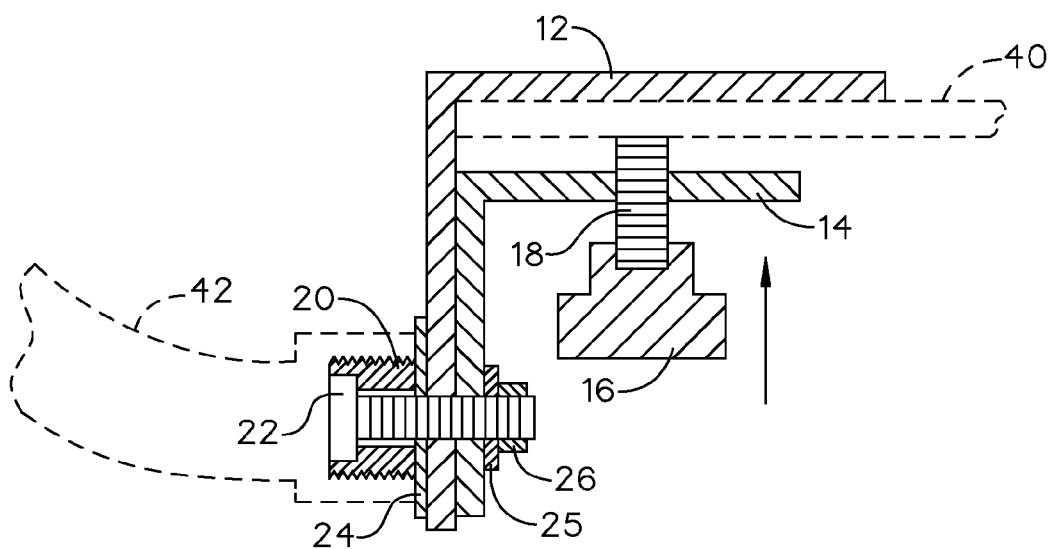
FIG. 6 is a section view of the present invention illustrating the movement of the knob of FIG. 3.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a music stand microphone mount that attaches a microphone to a shelf of a music stand. The present invention combines sheet music and a microphone onto one stand taking up less space on a small stage. The present invention is lighter and smaller in size and may be small enough to fit in a musician's gear bag.

Referring to FIGS. 1 through 8, the present invention includes a microphone mount 10. The microphone mount 10 may include a clamping portion 11. The clamping portion 11 may be used to releasably secure to an object. For example, the object may include a music stand shelf 40. A gooseneck 42 having a first end and a second end may connect to the microphone mount 10 at the first end. The second end of the gooseneck 42 may include a microphone clip which releasably secures a microphone.

In certain embodiments, the clamping portion 11 may include a first angle clamp 12 and a second angle clamp 14. The first angle clamp 12 may include a body portion, a top portion substantially perpendicular to the body portion, an outside surface, and an inside surface. The second angle clamp 14 may include a body portion and a top portion substantially perpendicular to the body portion. The second angle clamp 14 may be attached to the inside surface of the first angle clamp 12 so that the top portion of the first angle clamp 12 and the top portion of the second angle clamp 14 are substantially parallel to one another forming a slot 21 in between.

The present invention may further include a knob 15 that may be screwed in to clamp the object, such as the music stand shelf 40, within the slot 21. The knob 15 may include a knob handle 16 and a threaded knob post 18. At least one of the top portions of the first angel clamp 12 and the second angle clamp 14 may include a threaded opening 38. The threaded knob post 18 runs through the threaded opening 38 and into the slot 21. Therefore, a user may place the music stand shelf 40 within the slot 21 and turn the knob 15 to secure the microphone mount 10 to the music stand.

In certain embodiments, the present invention may include at least one threaded neck mounting post 20 protruding from the microphone mount 10. The gooseneck 42 may be releasably attachable to the mounting post 20. In certain embodiments, the threaded neck mounting post 20 may protrude from the outside surface of the body portion of the first angle clamp 12. A first bolt hole 34 through the first angle clamp 12 may align with a second bolt hole 36 through the second angle clamp 14. A threaded bolt 22 may be driven through the first bolt hole 34 and the second bolt hole 36. The threaded bolt 22 may protrude on an inside surface of the second angle clamp 14 and may be secured by a nut 26 and a washer 25. The neck mounting post 20 may be secured to the threaded bolt 22 on the outside surface of the first angle clamp 12, with a washer 24 sandwiched in between.

As illustrated in FIG. 1, the microphone mount 10 may be clamped to the music stand shelf 40. A user may place sheet music on the shelf and may secure a microphone to the gooseneck 42 that is attached to the microphone mount 10. In certain embodiments, a cord guide loop 28 may be secured to the microphone mount 10 to direct a microphone cord 44 to a certain direction. The cord guide loop 28 may include a hook fastener 30 and a loop fastener 32 attachable to the hook fastener 30 to form the loop.

Figure 7:
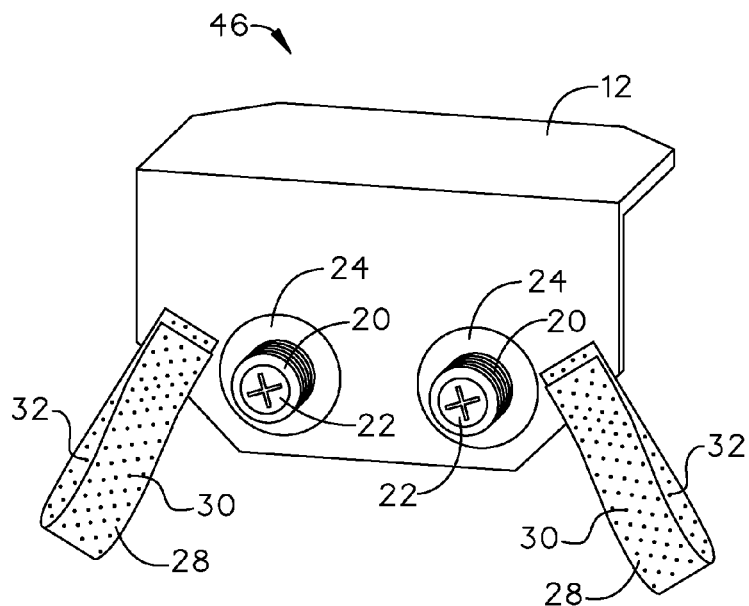
FIG. 7 is a perspective view of an alternate embodiment of the present invention.
Figure 8:
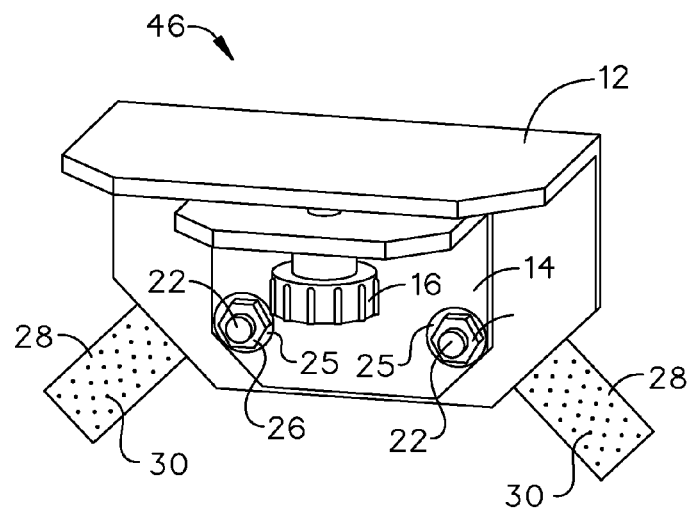
FIG. 8 is a rear perspective of an alternate embodiment of the present invention.

As illustrated in FIGS. 7 and 8, the present invention may include a plurality of connectors or neck mounting posts 20 to releasably attach a plurality of goosenecks 42 to the microphone mount 10. For example, the present invention may include a dual microphone mount 46 with two neck mounting posts 20. In such embodiments, the present invention may include two cord guide loops 28 to direct two different microphone cords 44 in a desired direction.

It should be understood, of course, that the foregoing relates to exemplary embodiments of the invention and that modifications may be made without departing from the spirit and scope of the invention as set forth in the following claims.

What is claimed is:

1. A microphone mount comprising:
    a clamping portion formed to releasably secure to an object, wherein the clamping portion comprises:
        a first angle clamp comprising a body portion, a top portion substantially perpendicular to the body portion, an outside surface and an inside surface;
        a second angle clamp comprising a body portion and a top portion substantially perpendicular to the body portion, wherein the body portion of the second angle clamp is attached to the inside surface of the body portion of the first angle clamp so that the to portion of the first angle clamp and the to portion of the second angle clamp are substantially parallel to one another forming a slot in between formed to receive the object; and
        a knob comprising a knob handle and a threaded knob post, wherein the threaded knob post runs through a threaded opening through one of the top portion of the second angle clamp and the top portion of the first angle clamp and into the slot; and
    a gooseneck comprising a first end and a second end, wherein the first end is attached to the outside surface of the first angle clamp and the second end comprises a microphone clip.

2. The microphone mount of claim 1, further comprising a threaded neck mounting post protruding from the outside surface of the body portion of the first angle clamp, wherein the gooseneck is releasably attachable to the threaded neck mounting post.

3. The microphone mount of claim 1, comprising a plurality of threaded neck mounting posts protruding from the outside surface of the body portion of the first angle clamp, wherein the gooseneck is releasably attachable to each of the plurality threaded neck mounting post.

4. The microphone mount of claim 1, further comprising a cord guide loop attached to the microphone mount.

5. The microphone mount of claim 2, further comprising a threaded nut formed to fit through aligning openings of the threaded neck mounting post, the first angle clamp, and the second angle clamp, thereby fastening the threaded neck mounting post, the first angle clamp, and the second angle clamp together.

* * * * *